Patented Aug. 20, 1935

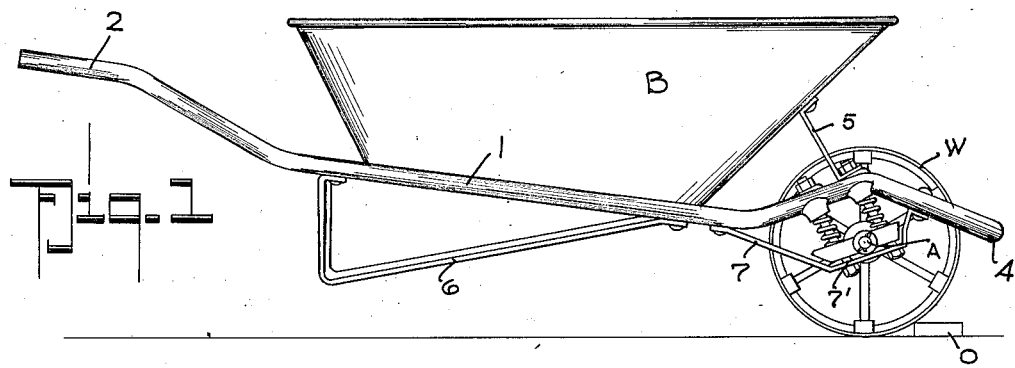
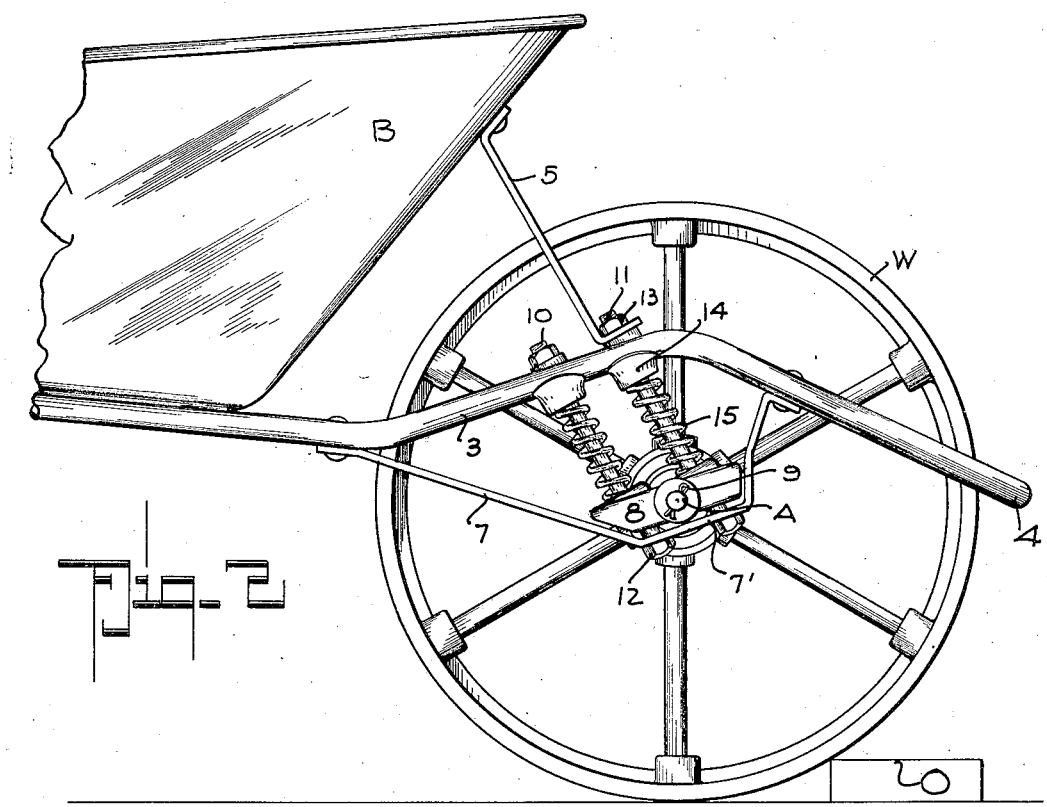
Geo. W. Snyder
Chas. A. Snyder

2,011,917

UNITED STATES PATENT OFFICE 2,011,917

WHEELBARROW

George W. Snyder and Charles A. Snyder, Onalaska, Wash.

Application May 29, 1934, Serial No. 728,122

1 Claim. (Cl. 280—52)

Our present invention relates to improvements in wheelbarrows of the type employing spring supports for the bed of the implement. While this class of implements is adapted for various uses, the wheelbarrow of our invention is designed especially for wheeling or conveying fluid or plastic cement from the mixer to the forms, or to other places for use. As is well known, the surface in and about buildings under construction, over which the wheelbarrow is trundled, is frequently encumbered with obstacles, and the surfaces are usually rough and uneven. By the novel construction and arrangement of parts in our spring-supported wheel barrow, the jolts and jars encountered by the wheel on rough surfaces are substantially absorbed before reaching the bed or barrow. When the wheel encounters an obstacle, and is abruptly and momentarily obstructed before rising over the obstacle, the spring-supported barrow and its load, because of the inertia of the forwardly moving barrow, assist in advancing the wheel, so that it rides freely over the obstacle. This impetus of the relatively moving barrow or bed assists in pushing the wheel over the obstruction, and as the movement of the barrow is cushioned by the spring support, spilling or splashing of the fluid contents of the barrow is avoided.

The invention consists in certain novel combinations and arrangements of parts, whereby the above objects are accomplished, as will hereinafter be more fully set forth and claimed. In the accompanying drawing we have illustrated one complete example of the physical embodiment of our invention wherein the parts are combined and arranged according to the best mode we have thus far devised for the practical application of the principles of our invention.

Figure 1 is a side view of a wheelbarrow embodying our invention, and shown in position for trundling.

Figure 2 is a similar view of the front part of the wheelbarrow, on an enlarged scale.

In order that the construction and utility of the several parts, and of their assembly, may readily be understood, we have illustrated an all-metal implement having the usual bed or barrow B; the wheel W, and its axle A on which the wheel is mounted.

The thills upon which the barrow is supported are shown as fashioned from a single bar that may be tubular or solid, and is provided with the two side bars 1, which terminate at the rear in handles 2, this handle portion of the bars being bent as indicated for convenience of the operator of the wheelbarrow.

At the front ends of the side bars 1 they are bent and incline upwardly to form parallel bearing bars, as 3, one at each side of the wheel, and at a point approximately perpendicular with the axle A when the implement is in use, these bearing bars are bent to terminate in the front U-shaped yoke 4, which extends around the front of the wheel W. As thus fashioned, the two bearing bars 3 and the legs of the yoke form an angular arch with the peak at approximately a point perpendicular with axle A and the ground beneath the wheel.

The bed or barrow is supported on the side bars 1, and the front inclined wall of the bed is attached to the front ends of the two bearing bars 3 by means of bars or braces 5 having their ends rigidly attached to the barrow and to the bearing bars.

The angular foot bars or rests 6 are attached to the undersides of the side bars 1 to support the load when the barrow is not in trundling position.

At each side of the wheel, beneath the bearing bars, and below the axle of the wheel are provided two main braces 7, which are bolted or riveted to the bearing bars and the legs of the yoke, and each of these main braces is fashioned with a flat base-bar 7' arranged in parallelism with the inclined bearing bars 3 of the implement. These base bars provide seats upon which the bearing blocks 8 rest, and the journal ends of the axle A extend through bearing holes in the blocks, the blocks being retained on the journals by means of cotter pins 9 passed through transversely extending holes in the journal ends.

The complementary, parallel, bearing bars 3 and base bars 7' are rigidly joined by two parallel bolts 10 and 11, one in front of the axle and one at the rear of the axle, and the bearing blocks are provided with bolt holes through which the bolts pass in order that the bolts may have a reciprocating or sliding action in the blocks. The heads 12 of the bolts bear up against the under face of the base-bar and the lock nuts 13 at the upper ends of the bolts bear against the top face of the side bars, the side bars and base bars, of course, being provided with holes for the bolts.

As indicated, the braces 5, between the bed of the implement and the side bars or bearing bars 3, are fastened by the nuts 13 on the bolts 11, and the rigidly connected braces 5, the bearing bars 3, the yoke 4, and the braces 7 provide a supporting frame for the wheel W.

Beneath the bearing bars 3 we preferably form guide bosses 14 through which the bolts 10 and 11 pass, and a pair of supporting springs 15 are coiled about the bolts 10 and 11 and interposed between these bosses and the bearing blocks 8 to provide the resilient support for the front portion of the bed of the implement.

By this arrangement and disposition of the guide bolts 10 and 11, which are rearwardly inclined from the perpendicular center of the wheel, the resiliently supported frame and bed of the implement is permitted to have a combined forward and downward movement with relation to the axle of the wheel. Thus, when the wheel encounters an obstacle, as O in the drawing and the wheel is abruptly and momentarily obstructed thereby, the front frame and the bed B of the barrow, as a whole, are permitted to move forward and downward under the inertia of the forwardly moving body of the implement. Under this movement the springs are compressed between the bearing bars and the bearing blocks to cushion the movement and provide the resilient support for the load. The forward movement of the load, with relation to the wheel, because of the inertia of the moving frame, bed and load, thus assists the operator of the implement in pushing the wheel over the obstacle, and the cushioning effect of the springs on the frame and bed of the barrow prevent jolting of the contents of the barrow, which would otherwise be splashed or spilt out of the barrow.

Under the usual minor jolts or jars, caused by rolling of the wheel over rough surfaces, the springs absorb the vibrations before they reach the bed of the barrow, and these vibrations are also prevented from reaching the hands of the operator of the implement, thereby lessening discomfort to the operator.

Having thus fully described our invention, what we claim as new and desire to secure by Letters Patent is:—

In a wheelbarrow, the combination with a wheel and its axle, of a substantially U-shaped frame-member comprising an arched portion at each side of the wheel and located above the axle, a main brace attached to each arched portion and including a base-bar beneath the axle, a pair of bolts inclined rearwardly to the perpendicular center of the wheel and rigidly joining a leg of the arched portion and a base bar, bearing blocks for the axle, said blocks having holes therein for said bolts, and springs coiled about said bolts and interposed between said leg and said base bar.

GEORGE W. SNYDER.
CHARLES A. SNYDER.